United States Patent
Kumar et al.

(10) Patent No.: US 8,473,773 B2
(45) Date of Patent: Jun. 25, 2013

(54) METHOD AND SYSTEM TO PROVIDE A COMPLIANCE CLOCK SERVICE SUITABLE FOR CLOUD DEPLOYMENT

(75) Inventors: Mohit Kumar, Santa Clara, CA (US); Anuja Jaiswal, San Jose, CA (US); Jayesh Gada, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 370 days.

(21) Appl. No.: 12/701,479

(22) Filed: Feb. 5, 2010

(65) Prior Publication Data
US 2011/0197088 A1    Aug. 11, 2011

(51) Int. Cl.
*G06F 1/14*    (2006.01)

(52) U.S. Cl.
USPC ............................. 713/503; 713/500

(58) Field of Classification Search
USPC .................................. 713/401, 503
See application file for complete search history.

(56) References Cited

U.S. PATENT DOCUMENTS

| | | | |
|---|---|---|---|
| 8,122,274 B2 * | 2/2012 | Hussain et al. | 713/400 |
| 2007/0038857 A1 * | 2/2007 | Gosnell | 713/165 |
| 2007/0118687 A1 * | 5/2007 | McGovern et al. | 711/112 |
| 2008/0263294 A1 * | 10/2008 | Kishi et al. | 711/159 |

FOREIGN PATENT DOCUMENTS

| | | |
|---|---|---|
| WO | WO-2005177591 A1 | 8/2005 |
| WO | WO-2005182776 A1 | 8/2005 |
| WO | WO-2011097235 A1 | 8/2011 |

OTHER PUBLICATIONS

"International Application Serial No. PCT/US2011/023355, Search Report mailed May 11, 2011", 5 pgs.
"International Application Serial No. PCT/US2011/023355, Written Opinion mailed May 11, 2011", 6 pgs.
"Introducing Time Addressable Storage: a common-sense approach to data protection", Toigo Partners International LLC: May 28, 2003, XP002339430,Retrieved from the Internet:URL:http://www.revivio.com [retrieved on Aug. 4, 2005] third point in the list; p. 3 p. 7 pp. 9-11 figures 2-4, 11 pgs.
"International Application Serial No. PCT/US2011/023355, International Preliminary Report on Patentability mailed Aug. 16, 2012", 6 pgs.

* cited by examiner

*Primary Examiner* — Dennis M Butler
(74) *Attorney, Agent, or Firm* — Mahamedi Paradice Kreisman LLP

(57) ABSTRACT

A method and system for providing an improved compliance clock service are described. An example method comprises establishing a system compliance clock (SCC) for a storage system that provides a compliant storage service, and establishing, for a volume in the storage system, a volume compliance clock (VCC). A current value of the SCC may be periodically updated based on hardware ticks monitored at the associated storage node. The volume compliance clock is to update its value based on a current value of the SCC.

18 Claims, 10 Drawing Sheets

METHOD AND SYSTEM TO PROVIDE A COMPLIANCE CLOCK SERVICE SUITABLE FOR CLOUD DEPLOYMENT

TECHNICAL FIELD

The present disclosure pertains to storage systems, and more particularly, to method and system for providing a compliance clock service suitable for cloud deployment.

BACKGROUND

Data storage is an increasingly crucial and central part of many industries dealing in financial transactions and other sensitive tasks, such as banks, government facilities/contractors, defense, health care institutions, pharmaceutical companies and securities brokerages. In many of these environments, it is necessary to store selected data in an immutable and unalterable manner. Forms of data that require immutable treatment often include e-mails, financial documents and transaction records, and any other record that may act as proof of an important action or decision. Even in less-critical/unregulated environments, the ability to store a secure unalterable data cache is highly desirable. For example engineering, medical, law and other professional firms may wish to establish a cache of key data (e.g. invention reports or design files, client communications, medical images, etc.), that will remain unaltered and online for long periods on time. These caches can provide reliable references and proofs for clients and other interested parties.

There are a number of government regulations that require a variety of data records be available for retrieval, for a specified period of time, from non-modifiable, non-erasable archives. For example, Securities and Exchange Commission (SEC) Rule 17a-4 (i.e., 17 C.F.R. §240.17a-4, hereinafter "the Rule") requires that certain stock exchange members, brokers, and dealers maintain certain records for a period of time (typically three or seven years). This data must therefore be archived for the period of time specified by the Rule in order to comply with the Rule. There may be various other reasons to store certain data for at least a predetermined period of time. A compliant storage service is used to store data reliably and without altering for a predetermined period that may be set by an administrator, predetermined by a manufacturer of the storage system, etc. "Compliant" storage refers to data storage that complies with predetermined requirement. Compliance generally requires that the data must be archived and cannot be deleted or modified until the end of the period for which it must be retained.

Some existing systems utilize a secure compliance clock to gauge the time relative to the retention period. A compliance clock uses a trusted time base (a source of the current time value that is as a reliable source), such as a repetitive file server process, to derive its time value. A file server is a computer attached to a network that has the primary purpose of providing a location for the shared storage of computer files. The clock may be designed to be tamper-resistant, and its time value (that is measured with respect to a value initially set by an administrator) is increased in a manner that the retention period is never reduced, but may be longer to further ensure observance of the full retention period. Alternatively, the clock can be based upon a trusted third-party clock (such as a government-based clock) or an additional secure hardware-based clock. In existing systems, compliance clock falls behind when a volume is powered down, etc., which may result the actual retention time to be greater than the required retention time and thus cause inefficient use of storage resources. A "volume" is a set of stored data associated with a collection of mass storage devices, such as disks, which obtains its storage from (i.e., is contained within) an aggregate, and which is managed as an independent administrative unit.

SUMMARY

An improved compliance clock service is provided for use with a compliant data storage service. In one embodiment, an improved compliance clock service comprises a system-wide master clock (termed system compliance clock or SCC) and a plurality of volume compliance clocks (VCCs), where a VCC is maintained for each volume in the compliant storage system. The current value of the SCC is increased periodically, using hardware ticks obtained from the node on which the SCC is being maintained. A hardware tick, also referred to as a hardware clock tick or a cycle, the smallest unit of time recognized by a device. A VCC value is initialized to the current value of the SCC and then periodically updated, each time utilizing the current value of SCC to determine elapsed time from the last VCC update, thus localizing compliance time skews to affected volumes and increasing the accuracy of the retention time. This relationship between the SCC and VCC makes an example compliance clock service suitable for use in systems configured to provide data retention in, for example, a cloud deployment, where some of the features of a cloud storage infrastructure include ability to expand or reduce storage capacity of the storage system, ability to move physical storage devices between the servers, reliable protection of data against modification and unauthorized access, and ability to utilize power saving measures.

BRIEF DESCRIPTION OF THE DRAWINGS

Embodiments of the present invention are illustrated by way of example and not limitation in the figures of the accompanying drawings, in which like reference numbers indicate similar elements and in which.

DETAILED DESCRIPTION

Figure 1:
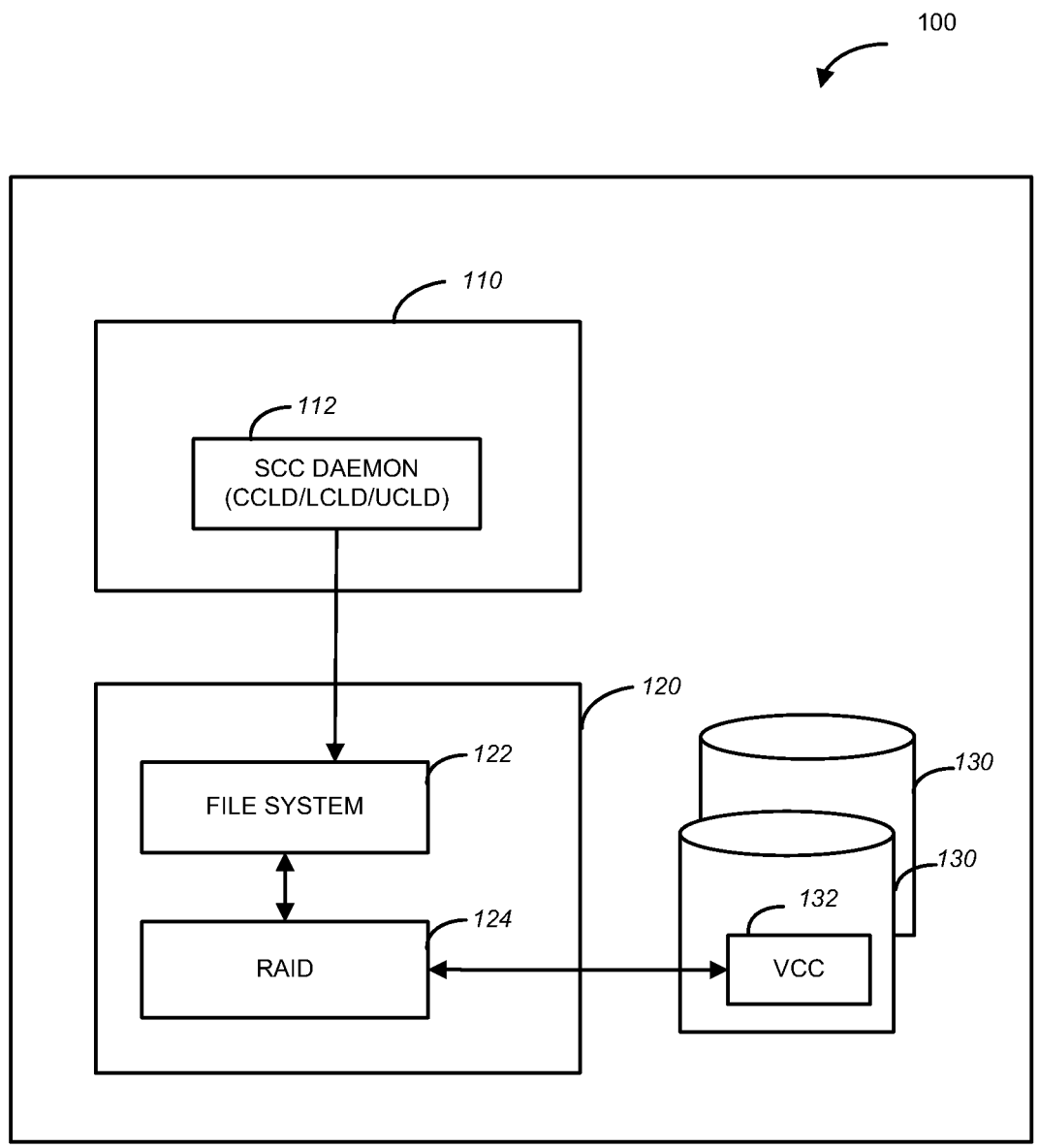
FIG. 1 is a diagrammatic representation of an architecture of a compliance clock service, according to one example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Method and system are presented for providing an improved compliance clock service. A compliance clock service, in one example embodiment, may be provided in a cluster of storage servers, as well on an unclustered storage server running a storage operating system. A compliance clock service provides a tamper resistant time base for data retention and may eliminate time skews resulting from taking volumes off line and localize inevitable time skews to the concerned volume, thereby avoiding a ripple effect. A compliance clock service, in one example embodiment, comprises at least one volume compliance clock (VCC) and a system compliance clock (SCC).

VCC provides tamper resistant reference time per volume in a compliant storage system. The value of a VCC is used to determine the retention dates and expiry of objects within the volume. VCC uses the system-wide compliance clock value (SCC value) as reference to update its current value. In embodiments where a storage system is a cluster of storage servers (or nodes) the system-wide compliance clock is a cluster-wide compliance clock.

An SCC operates by employing a plurality of processes (also referred as daemons) running on one or more nodes of the associated storage system. These processes include a node compliance clock daemon and a tick daemon. The node compliance clock daemon cooperates with the tick daemon to maintain node-specific compliance clock. The tick daemon stores the current SCC value in memory and makes the current SCC value available to VCCs associated with the node. In a clustered storage system, a node compliance clock daemon running on a node that is designated as a master node is a cluster clock daemon; a node compliance clock daemon that runs on any other node in the cluster is a local clock daemon. Local clock daemons in a cluster obtain synchronize their respective compliance clock values from the current SCC value that may be provided periodically by the cluster clock daemon. In an unclustered storage system, a node compliance clock daemon is termed an unclustered clock daemon. Example architecture of a compliance clock service may be described with reference to FIG. 1.

FIG. 1 shows a storage server (also referred to as a filer or a node) 100. The filer 100 comprises a management host 110, a data blade 120, and one or more volumes 130. The data blade 130 may be a data blade that is co-located with the management host 110 or is connected to the management host 110 via a network connection. The management host 110, in one embodiment, is a module responsible for management functions with respect to a filer. The data blade 120, in one embodiment, is a module that hosts a file system associated with the filer. The volumes 130 are write-once-read-many (WORM) volumes, in which selected files cannot be modified, erased or otherwise deleted once they are committed to storage, at least until the expiration of an applicable retention period.

The management host 112 includes an SCC process 112 that may also be termed a node compliance clock daemon. As mentioned above, a node compliance clock daemon may be a clustered clock daemon (if the filer 100 is part of a cluster of storage servers and is designated as a master node in the cluster) or a local clock daemon (if the filer 100 is not as a master node in the cluster). The SCC process 112 may be an unclustered clock daemon if the filer 100 is an unclustered storage server. The SCC process 112 cooperates with a tick daemon running on the data blade 120 to periodically update the SCC value that is used as the current SCC value for updating respective VCCs 132 on the volumes 130. As shown in FIG. 1, the data blade 120 includes a file system 122 (alternatively, the file system 122 may be replaced by a layer of abstraction for organizing the data on the storage devices) and a RAID component 124 that bridge the SCC process 112 and the VCC 132. RAID (redundant array of inexpensive disks) is a storage scheme that can divide and replicate data among multiple hard disk drives. It will be noted that in some embodiments a compliance clock service may be implemented in an architecture that does not include a separate management host and a separate data blade, while the VCCs are updated based on the current SCC value via a file system associated with the respective VCC.

The VCC 132 is a compliance clock maintained on a per volume basis that provides the reference time to determine retention and expiry of data objects in the volume 130. In one embodiment, the VCC 132 may be initialized once during the lifetime of the volume. The VCC 132 may obtain its starting value from the system-wide compliance clock (SCC) at the time of volume creation or, alternatively, from the compliance clock value stored in the volume (e.g., in case of an upgrade from some versions of the associated storage operation system). The VCC 132 uses the current SCC value as reference to update itself. The updates of the VCC value on the volume may be performed when a write operation is performed with respect to the volume. If one of the volumes 130 is taken off-line (such that as it is no longer accessible as part of the storage system) and then brought back on line after a period of time (thus permitting again access to data stored on the volume via the storage server), the associated VCC value is updated based on the elapsed time measured with reference to the current value of the SCC and a reference SCC value that is stored on the volume whenever the VCC value is updated. The VCC value may thus be advanced accurately even when a volume is powered-down or otherwise taken off-line for an extended period of time.

In one example embodiment, each volume 130 may store on-disk metadata, as shown in Table 1 below. The metadata may be generated at initialization of the volume, using data provided by the filer 122.

TABLE 1

VCC time: a timestamp indicating the VCC value
SCC time: a timestamp indicating the SCC value at the last update of the VCC
Node id: a unique identifier for the node
Cluster id: a unique identifier for the cluster
SCC id: a unique identifier for the SCC
SCC scope: an indicator of whether the scope of the SCC is a node or a cluster The metadata shown in Table 1, which may be termed compliance clock metadata and may include other fields, may be utilized to detect any change in the Node/Cluster/SCC association of a given volume and perform appropriate actions to maintain the VCC correctly.

As noted in Table 1 above, the SCC scope parameter identifies whether the containing node is maintaining the current value of SCC using a cluster/local clock daemon or an unclustered clock daemon. The SCC scope parameter determines whether the Node id or the Cluster id parameter needs to be matched to confirm correct association prior to authorizing an update of the VCC. The SCC id may also be used when the SCC needs to be reinitialized. The reinitialization operation causes the SCC id of the SCC to change. In such cases, the Node/Cluster association does not change and the SCC id parameter may be used to detect a change in association. In addition, the SCC id provides another level of association check on top of the Node/Cluster id. In one embodiment, the VCC (or the VCC value) value is updated as shown in Table 2.

TABLE 2 new VCC time = stored VCC time + time elapsed since last update
time elapsed since last update = current SCC time − last update SCC time As is shown in Table 1, an updated value of the VCC may be calculated as the sum of the current value of the VCC and an elapsed time value. The elapsed time value is determined by subtracting the SCC reference value from a current value of the SCC.

In one example embodiment, the VCC 132 is updated only if the SCC association matches, which is determined using SCC id, Node id (if the SCC scope is "Node") and using SCC id, Cluster id (if the SCC scope is "Cluster"). A change in SCC association, determined by comparing metadata associated with the volume with the values provided by the filer 100, may be treated as an indication that the current SCC time provided to the volume 130 cannot be trusted. If it is determined that that the current SCC time provided to the volume 130 cannot be trusted, the current SCC time is discarded and the VCC time is not updated at the next update with the assumption that the time elapsed is zero. The SCC id and other metadata may be updated if it is necessary to adopt the new SCC (e.g., the filer 100 determines that a new SCC is adopted and stored an updated SCC id value on volumes associated with the filer 100). An update to the compliance metadata on a volume may cause a skew in the VCC time. In order to minimize such skews, all operations which may change SCC association (SCC/Cluster/Node id) may be preceded by an attempt to update the VCC 132 before proceeding. In some embodiments, any command that may potentially lead to a skew of the VCC time may also be preceded by an attempt to update the VCC 132 before proceeding. For example, in response to a request to join a node into a cluster, the VCC 132 is updated before the join operation is completed. Some of the commands that may potentially lead to a skew of the VCC time include commands that take a volume off-line, restrict a volume, move a volume, or cluster commands that join and unjoin a node into the cluster.

Compliance metadata associated with the VCC 132 may be updated on disk when a write operation is performed with respect to the volume. In some embodiments, the VCC value may be synchronized with the current SCC value (the process referred to as catching up) at a configurable rate (e.g., maximum of 7 days per year), in order to compensate for any skews that may occur between the VCC 132 and SCC 112. The catch up operation may be performed in small increments to the stored VCC value, which may be performed automatically or by an administrator interfacing with the storage server.

Figure 2:
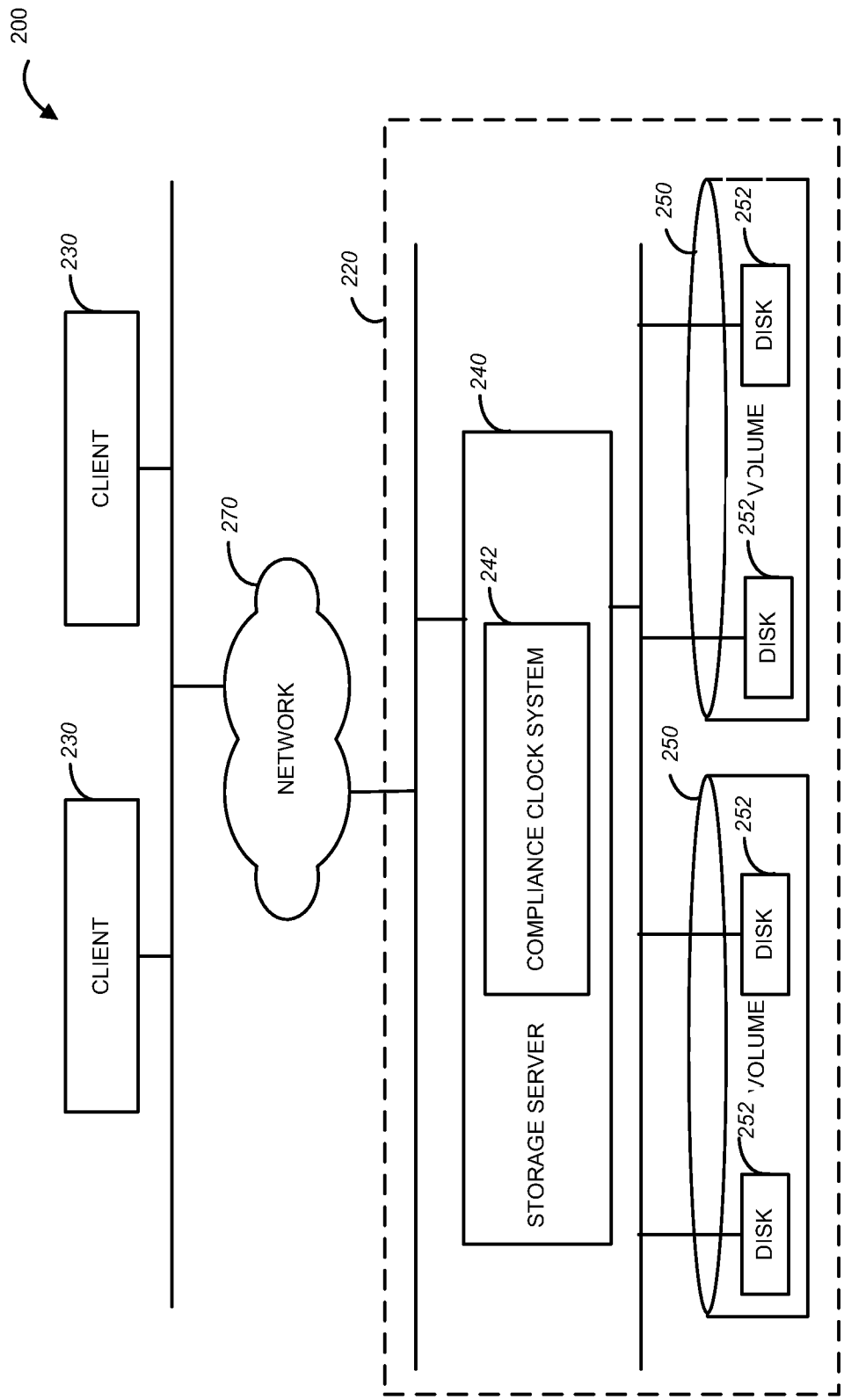
FIG. 2 is a diagram of a network environment within which an embodiment of an improved compliance clock service may be implemented.

FIG. 2 illustrates a network 200 in which embodiments of the invention may be implemented. The network 200 includes a storage system 220 serving one or more clients 230. The clients 230 access the storage system 220 via a network 270. The network 270 may be, for example, a local area network (LAN), wide area network (WAN), metropolitan area network (MAN), the Internet or other network as is known in the art or combinations thereof. The storage system 220 includes one or more networked storage servers 240 connected to one or more networked mass storage devices, e.g., disks 252.

The storage devices connected to the storage servers 240 may also include, for example, magnetic disks, magnetic tape, optical storage devices such as DVDs and/or any other similar media adapted to store data persistently. In an illustrative embodiment, the disks 252 are arranged into a plurality of volumes 250. A volume may include one or more file systems, according to one embodiment. A "file system" is an independently managed, self-contained, hierarchical set of data units. A volume or file system may store data in the form of files or in the form other units of data, such as blocks or logical units (LUNs).

In one embodiment, the physical disks 252 are configured into RAID groups. In one embodiment this organization is arranged so that some disks store striped data and some disks store separate parity for the data, in accordance with a RAID configuration (e.g., RAID-DP (double-parity) or RAID Level 4 (RAID4)). The volumes 250 are write-once-read-many (WORM) volumes, in which selected files cannot be modified, erased or otherwise deleted once they are committed to storage, at least until the expiration of an applicable retention period.

The retention period is maintained, in one embodiment, by a compliance clock system 242 provided with the storage server 240. The compliance clock system 242 provides improved compliance clock service and may include an SCC serving as a master clock and a VCC for each volume that derives its value from the current value of the system compliance clock. As mentioned above, a storage service enhanced with a compliance clock service provided by the compliance clock system 242 may be deployed on a cloud, utilizing cloud computing infrastructure. An architecture that relies upon a remotely deployed internet-accessible server tier (e.g., utilizing a web browser-based client) to provide functionality is commonly referred to as software-as-a-service (SaaS) or cloud computing. The term software-as-a-service (SaaS) is used as a blanket term for a set of features that uses network-accessible hosted service architecture. An example of a storage service deployed on a cloud (as a service over the Internet) is shown in FIG. 3.

Figure 3:
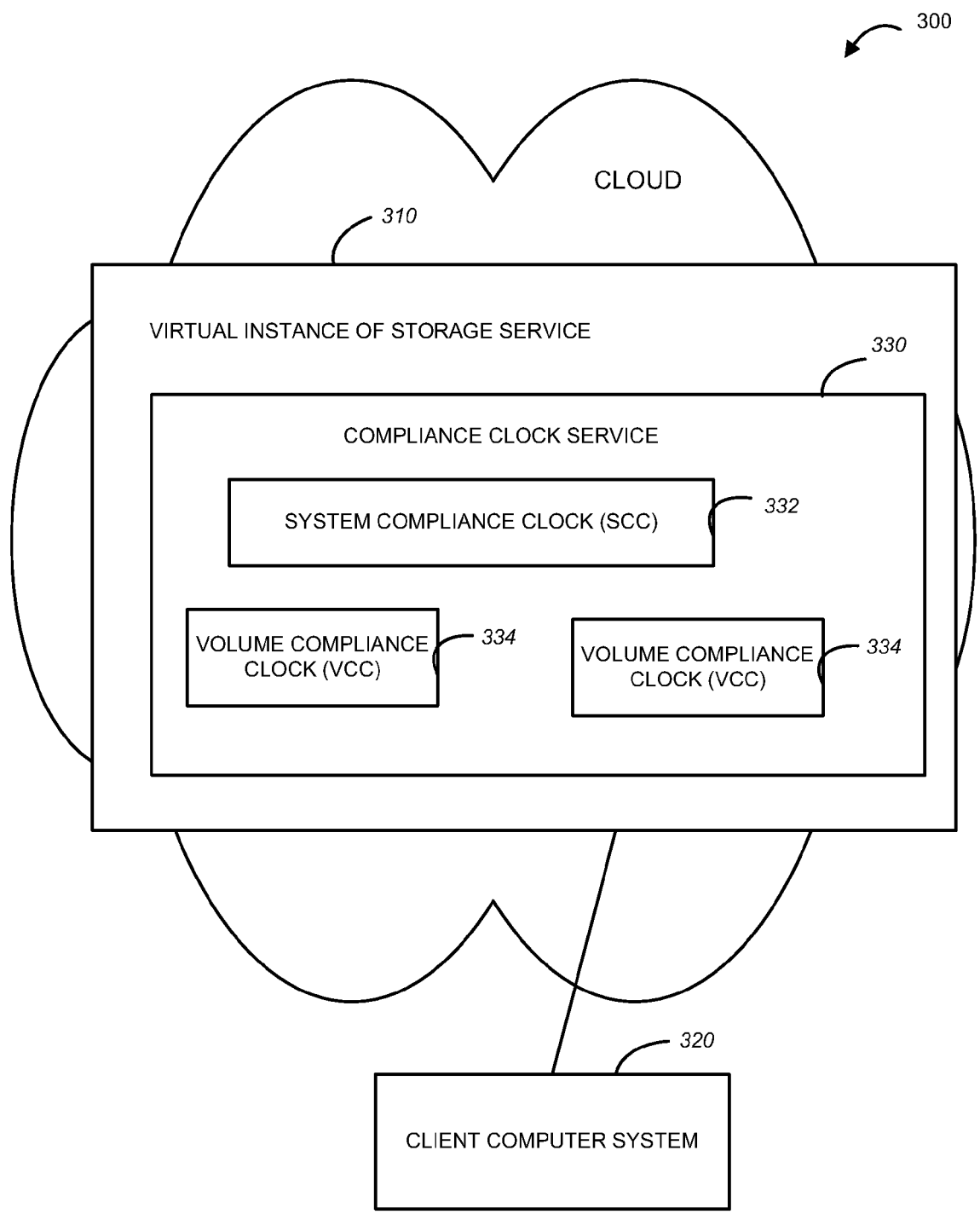
FIG. 3 is a diagrammatic representation of an example of a compliant storage service deployed on a cloud, according to one example embodiment.

FIG. 3 shows a block diagram illustrating a network environment 300, where a virtual instance of a storage service 310 is running on a cloud, according to one example embodiment. As shown in FIG. 3, the environment 300 includes a virtual instance 310 of a storage service and a client computer system 320. The virtual instance 330 of a storage service comprises a system compliance clock 332 and one or more volume compliance clocks 334. The data accessible to the client via the virtual instance 330 is stored on the disks 252 (that may be physically located at a facility of the provider of the storage system 220). In one embodiment, the virtual instance 330 of a storage service is running within a public virtualization space, such as, for example, the virtualization space provided by Amazon's Elastic Compute Cloud (EC2) service. When a request from a client computer system to launch a computing application (e.g., a storage management application) is received, a call is made to the application programming interface (API) associated with the virtualization service to trigger the loading of a machine image associated with the requested computing application. The machine image is a read-only boot image for a virtual instance. The associated virtual instance launched on a cloud is loaded with the contents of the machine image. An example of deploying, on a cloud, a storage service equipped with an improved compliance clock service is illustrated in FIG. 4.

Figure 4:
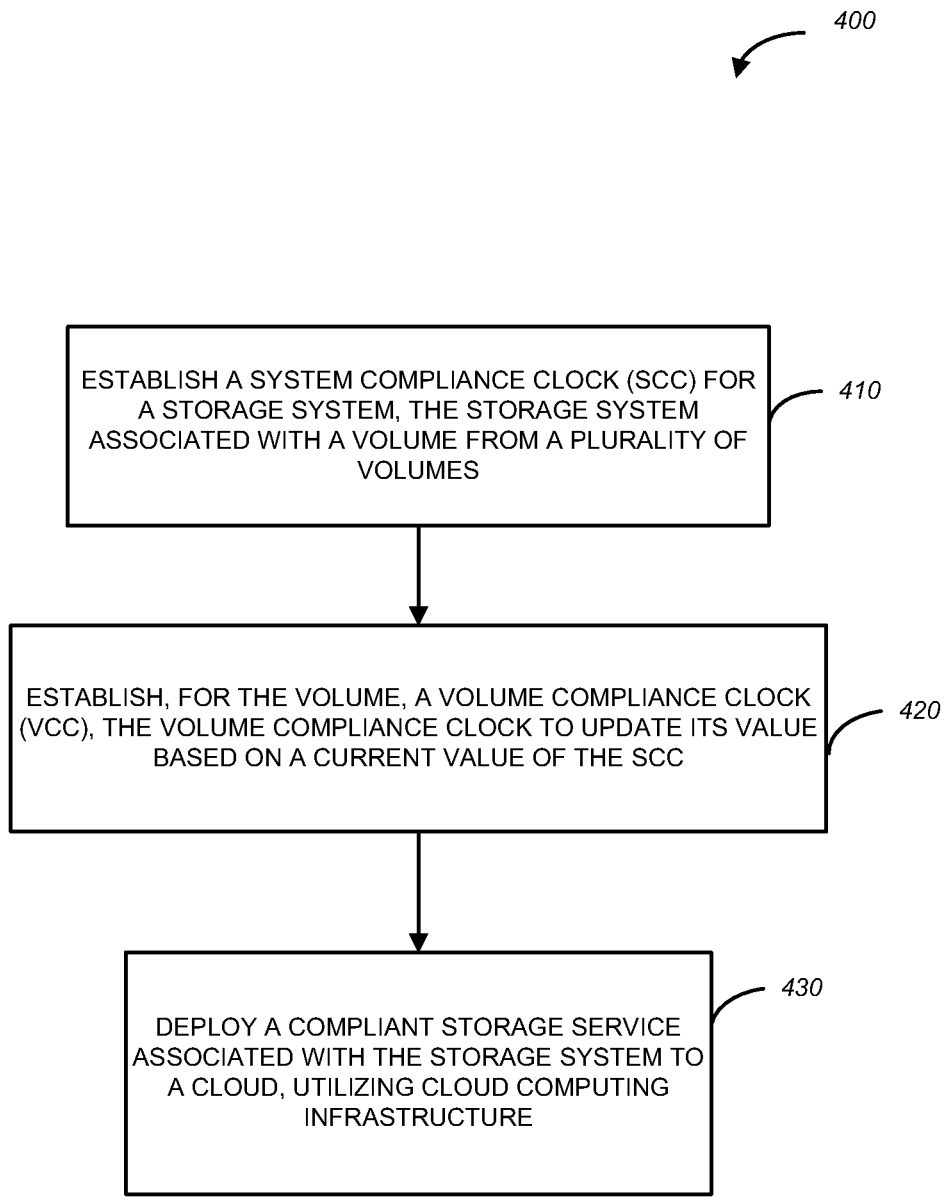
FIG. 4 is a flow chart of a method for providing an improved compliance clock service on a cloud, according to one example embodiment.

FIG. 4 is a flow chart of a method 400 for providing an improved compliant storage service suitable for being deployed on a cloud, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the storage server 240 shown in FIG. 2.

As shown in FIG. 4, the method 400 commences at operation 410, with establishing an SCC for a compliant storage system that maintains a plurality of volumes. At operation 420, a VCC is established for one or more volumes in the storage system. As mentioned above, the current value of a VCC is updated based on determined elapsed time with reference to the SCC. A compliant storage service associated with the storage system is then deployed to a cloud at operation 430, utilizing cloud computing infrastructure. Specifically, in one example embodiment, the storage system 220 of FIG. 2 receives a request from the client 230 of FIG. 2 to launch a storage service (also referred to as a storage management application) that permits access and management of data stored by the storage system 220. The storage system 220 communicates with a virtualization provider that causes the launching of the read-only boot image for the virtual instance 330 of a storage service that comprises the system compliance clock 332 and the volume compliance clocks 334. The client 230 may then perform any data access and management functions via the virtual instance 330 provided by the storage service, utilizing a web browser application.

The data accessible to the client 230 via the virtual instance 330 is stored on the disks 252 (that may be physically located at a facility of the provider of the storage system 220).

An example storage server configured to provide an improved compliance clock service, may be described with reference to FIG. 5.

Figure 5:
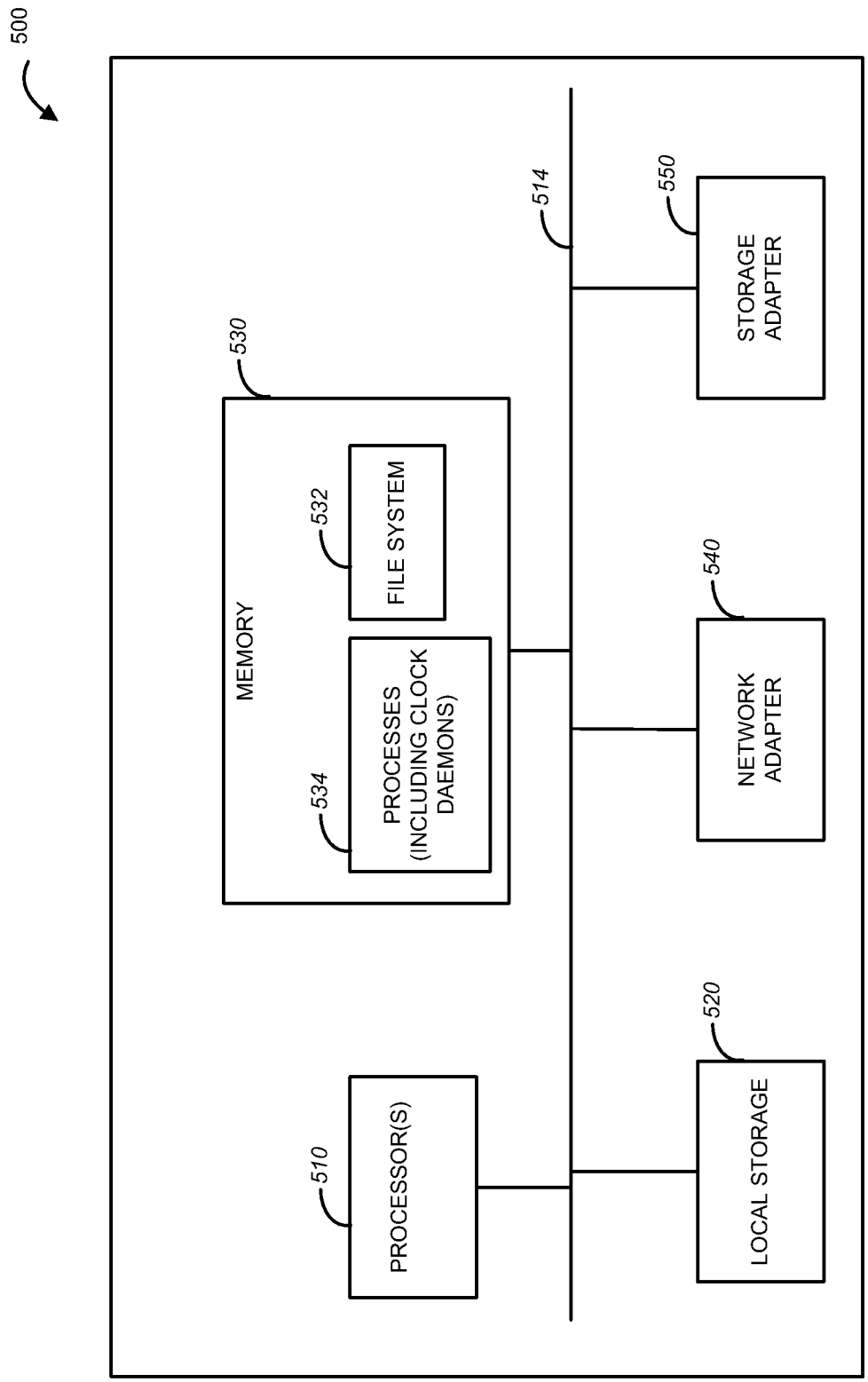
FIG. 5 is a diagram of an example storage server configured to provide an improved compliance clock service.

Referring now to FIG. 5, a storage server 500 comprises host processor(s) 510, a memory 520, a network adapter 540, a storage adapter 550, and a local storage 530 coupled by a bus 514. The processors 510 are the central processing units (CPUs) of the storage system 220 shown in FIG. 2 and, thus, control the overall operation of the storage system 220. In certain embodiments, the processors 510 accomplish this by executing software, such as that described in more detail herein. The processors 510 may include one or more programmable general-purpose or special-purpose microprocessors, digital signal processors (DSPs), programmable controllers, application specific integrated circuits (ASICs), programmable logic devices (PLDs), or the like, or a combination of such devices.

The memory 530 comprises storage locations that are addressable by the processors 510 and adapters (a network adapter 540 and a storage adapter 550) a file system 532, and one or more processes 534. The processors 510 and adapters 550 and 540 may, in turn, comprise processing elements and/or logic circuitry configured to execute the software code and manipulate various data structures. The memory 530 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The network adapter 540 comprises a plurality of ports adapted to couple the storage system 220 to one or more clients 230 (shown in FIG. 2) over point-to-point links, wide area networks, virtual private networks implemented over a public network (Internet) or a shared local area network. The network adapter 540 thus may comprise the mechanical, electrical and signalling circuitry needed to connect the node to the network.

The storage adapter 550 cooperates with the host operating system executing on the storage system 220 to access data from disks 252 (shown in FIG. 2). The storage adapter 550 comprises a plurality of ports having input/output (I/O) interface circuitry that couples to the disks 150 over an I/O interconnect arrangement, such as a conventional high-performance, fibre channel (FC) link topology.

The local storage 530 is a device that stores information within the storage server 500, such as software applications, host operating system, and data. The storage server 500 loads the software applications and host operating system into the memory 530 as running processes 534. The processes 534, in one example embodiment, include one or more processes associated with the compliance clock service provided by the compliance clock system 242 of FIG. 2. As mentioned above, the processes associated with the compliance clock service may be referred as compliance clock daemons. Compliance clock daemons are used to maintain the value of the system-wide compliance clock and to propagate the current value of the system-wide compliance clock to the volumes within the storage system. As discussed above, compliance clock daemons include node compliance clock daemons and a tick daemon. Interactions between compliance clock daemons in a cluster of storage servers, as provided by one example embodiment, may be described with reference to FIG. 6.

Figure 6:
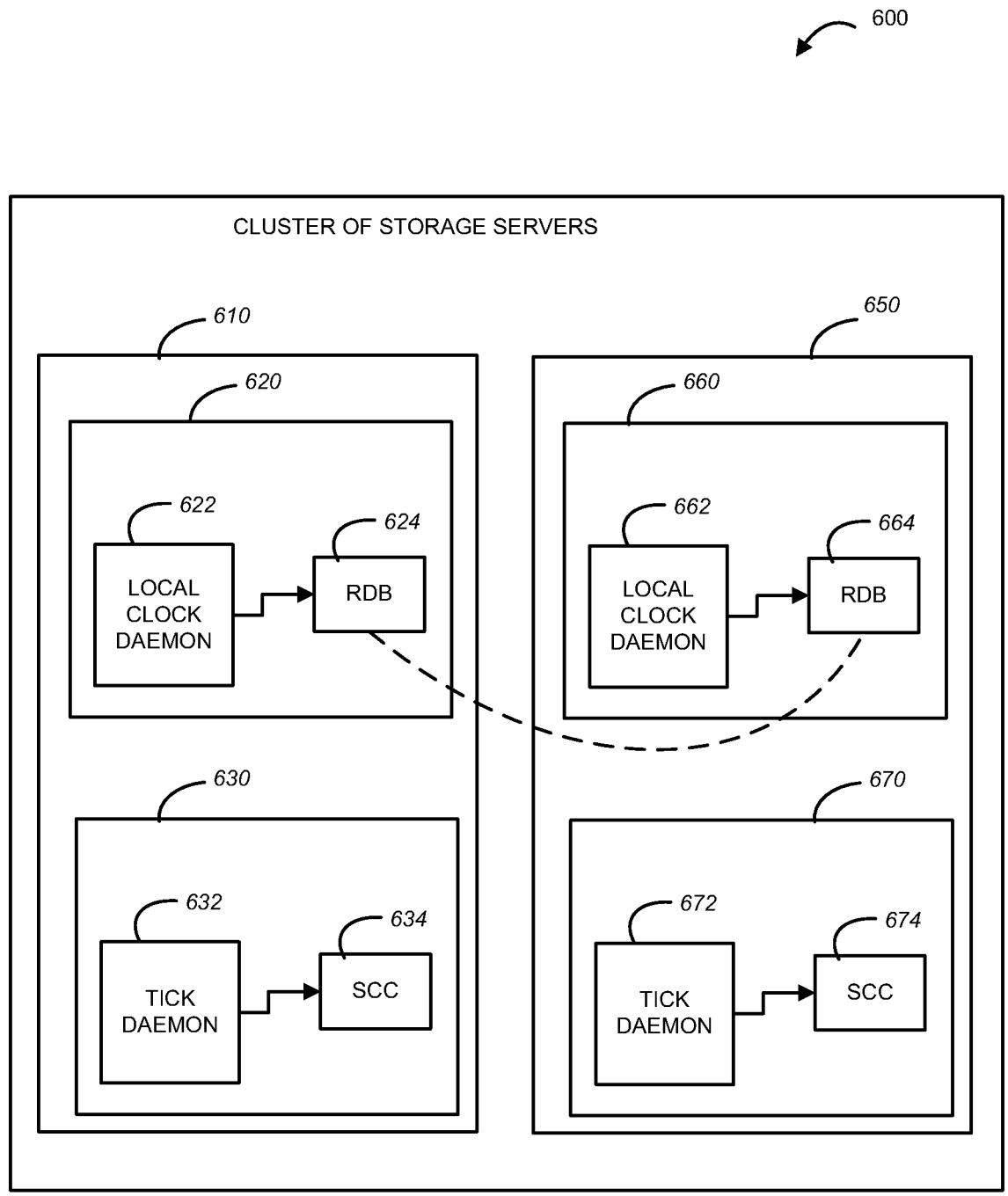
FIG. 6 is a diagrammatic representation of example interactions between compliance clock daemons in a cluster of storage servers, according to one example embodiment.

Shown in FIG. 6 is a cluster 600 equipped with a compliance clock system that comprises a system-wide compliance clock SCC (a cluster SCC) and a VCC for any volume in the cluster that was designated to store data that is to be retained for a certain compliance period. The cluster 600 comprises a master node 610 (that has been designated as a master node for the cluster with respect to an associated compliance clock service) and a node 650. The nodes 610 and 650 include respective management hosts 620 and 660 and respective data blades 630 and 670. The management host 620 provided on the master node 610 runs a cluster clock daemon 622, while the management host 660 provided on the node 650 runs a local clock daemon 662. The data blades 630 and 670 run respective tick daemons 632 and 672.

The tick daemon 632 ticks the system compliance clock SCC 634 (by increasing the value of the compliance clock SCC 634) and periodically provides the current SCC value to the cluster clock daemon 622, e.g., via a remote procedure call (RPC). The cluster clock daemon 622 updates the received SCC value into a replication database (RDB) 624. From the replication database (RDB) 624, the SCC value is provided to a replication database 664 maintained on the node 650. The local clock daemon 662 running on the node 650 receives an update notification from the replication database 664 and communicates the updated current SCC value to the tick daemon 672, which then updates the SCC 674 on the node 650. The dashed line connecting the RDB 624 and the RDB 664 illustrates an RDB replication ring.

In one embodiment, communications from a management host to a data blade are performed using a set of customized APIs. For example, when a node joins the cluster 600, the cluster clock daemon 622 receives a notification that a new member has joined the cluster. In response, the cluster clock daemon 622 issues a customized API call to the data blade 630 to obtain the current value of the SCC stored in the SCC 634. The RDB 624 is updated with the obtained current value of the SCC. The update of the RDB 624 triggers an update notification to all nodes in the cluster 600 (including the node 650).

Figure 7:
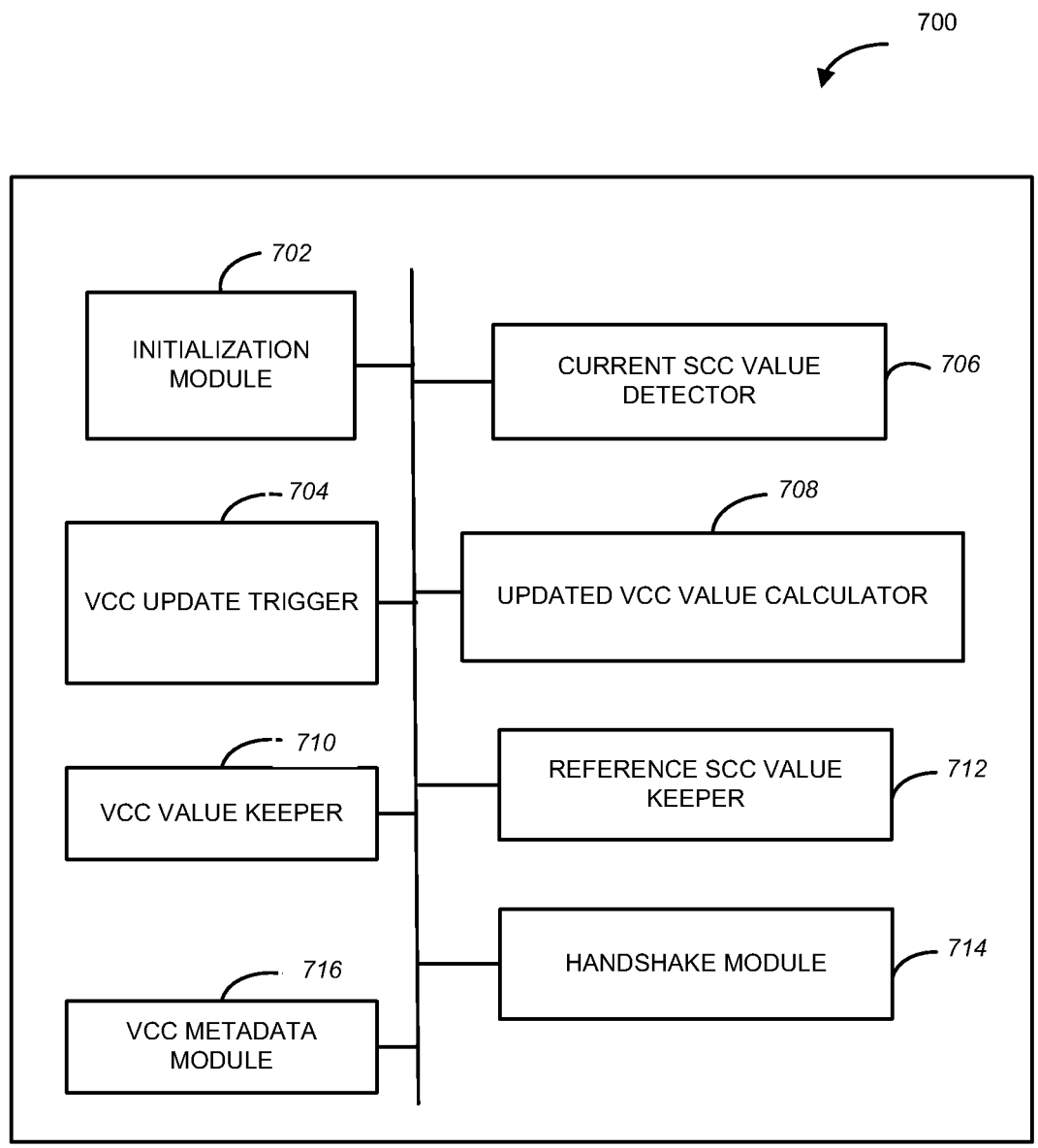
FIG. 7 is a diagram of an example compliance clock system.

An example compliance clock system may be viewed as a collection of functional modules and may be discussed with reference to FIG. 7. As shown in FIG. 7, a compliance clock system 700 comprises an initialization module 702, a VCC update trigger 704, a current SCC value detector 706, an updated VCC value calculator 708, a VCC value keeper 710, a SCC reference value keeper, a handshake module 714 and a VCC metadata module 717. The modules of the compliance clock system 700 may be implemented in software, hardware, or a combination thereof. In one embodiment, the modules of the compliance clock system 700 may be implemented by the processor 510 of FIG. 5.

The initialization module 702 may be configured to set a current value of the VCC to a current value of the SCC. The VCC update trigger 704 may be configured to detect an update event (e.g., an update of backup data associated with the volume). The current SCC value detector 706 may be configured to determine the current value of the SCC, e.g., by accessing the current value of the SCC maintained by a tick daemon. The updated VCC value calculator 708 may be configured to update the current value of the VCC based on the current value of the SCC. The VCC value keeper 710 may be configured to store the current value of the VCC on the volume, e.g., in the root directory. The SCC reference value keeper 712 may be configured to store a SCC reference value on the volume and update the SCC reference value with the current value of the SCC. The handshake module 714 may be configured to determine whether the SCC is a trusted SCC prior to authorizing an update to the current value of the VCC, e.g., by performing a comparison between of the values stored as compliance metadata on the volume with the corresponding values associated with the SCC. The VCC metadata module 717 may be configured to store compliance clock metadata on the volume. An example operations performed by the compliance clock system 700 may be discussed with reference to FIG. 8.

Figure 8:
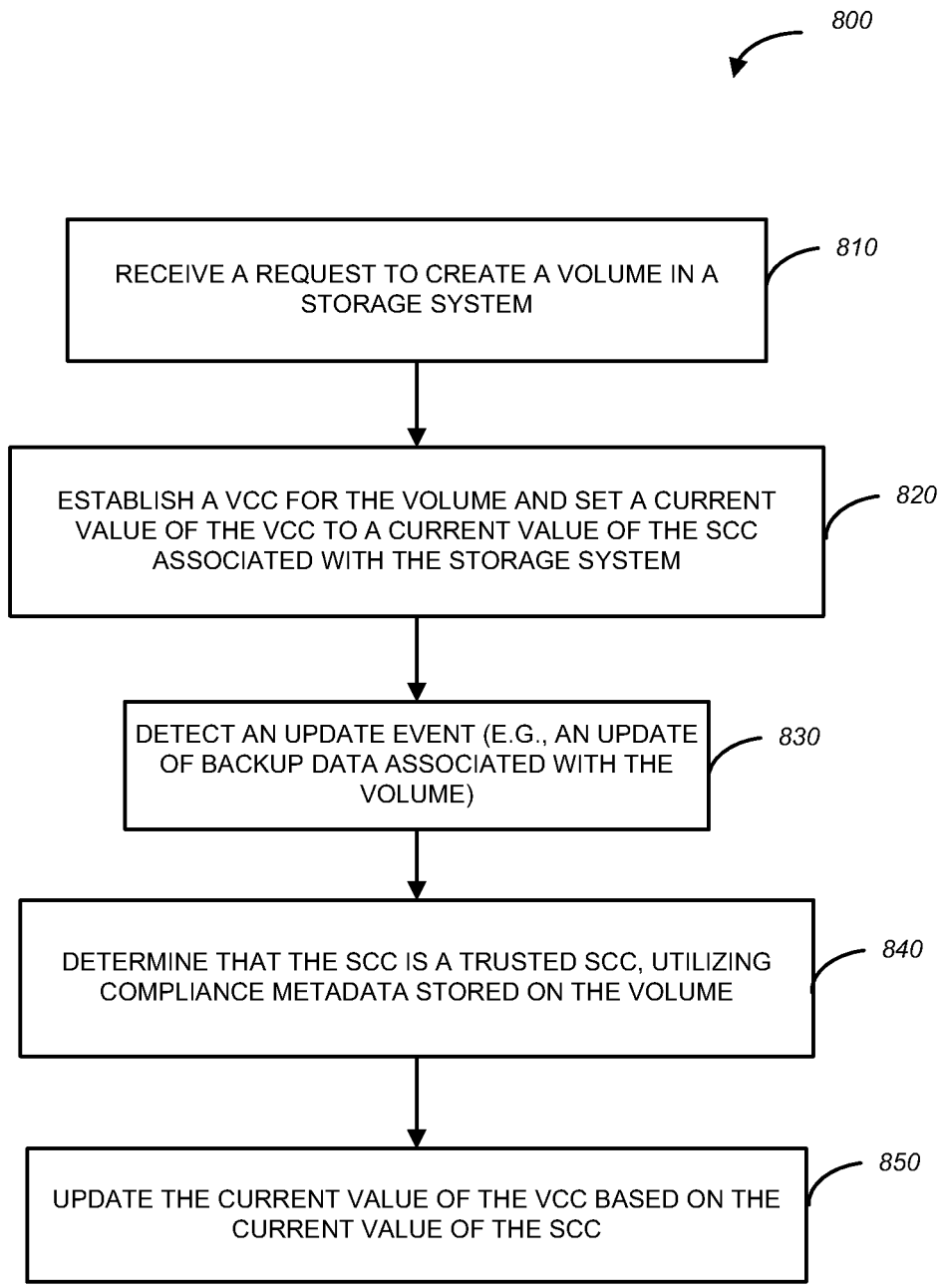
FIG. 8 is a flow chart of a method performed by a compliance clock system, according to one example embodiment.

FIG. 8 is a flow chart of a method 800 for providing an improved compliant storage service, according to one example embodiment. The method 800 may be performed by processing logic that may comprise hardware (e.g., dedicated logic, programmable logic, microcode, etc.), software (such as run on a general purpose computer system or a dedicated machine), or a combination of both. While the processing logic may reside at one or more storage servers, in one example embodiment the processing logic resides at the storage server 500 shown in FIG. 5.

As shown in FIG. 8, in response to a request to create a volume that is a subject to data retention policy (operation 810) in a storage system, the initialization module 602 of FIG. 6 initializes the current value of the associated VCC to the current value of the system-wide compliance clock SCC (operation 820) and also stores on the volume compliance clock metadata, as described with reference to Table 1 above. At operation 830, the VCC update trigger 604 of FIG. 6 detects an update event, e.g., an update of backup data associated with the volume, and the handshake module 614 determines, at operation 840, whether the SCC is a trusted SCC, utilizing compliance clock metadata stored on the volume. At operation 850, the updated VCC value calculator 608 determines the updated VCC value based on the current value of the SCC and updates the current value of the VCC with the updated VCC value. As explained above, with reference to Table 2, the updated value of the VCC may be calculated as the sum of the current value of the VCC and an elapsed time value, wherein the elapsed time value is determined by subtracting the SCC reference value (corresponding to the value of the SCC at the time of the last VCC update) from a current value of the SCC.

As mentioned above, in a cluster of storage servers one node may be designated as the master node and the current value of the SCC may be determined based on the node compliance clock process running on the master node. In the event where the master node in a cluster fails, another node from the cluster may be designated as the new master node, such that the current value of the SCC may be determined based on the node compliance clock process running on the new master node. Designating another node from the cluster may be based, e.g., on the order in which the nodes were initialized in the cluster or some other criteria. Example failover operations may be discussed with reference to FIG. 9.

Figure 9:
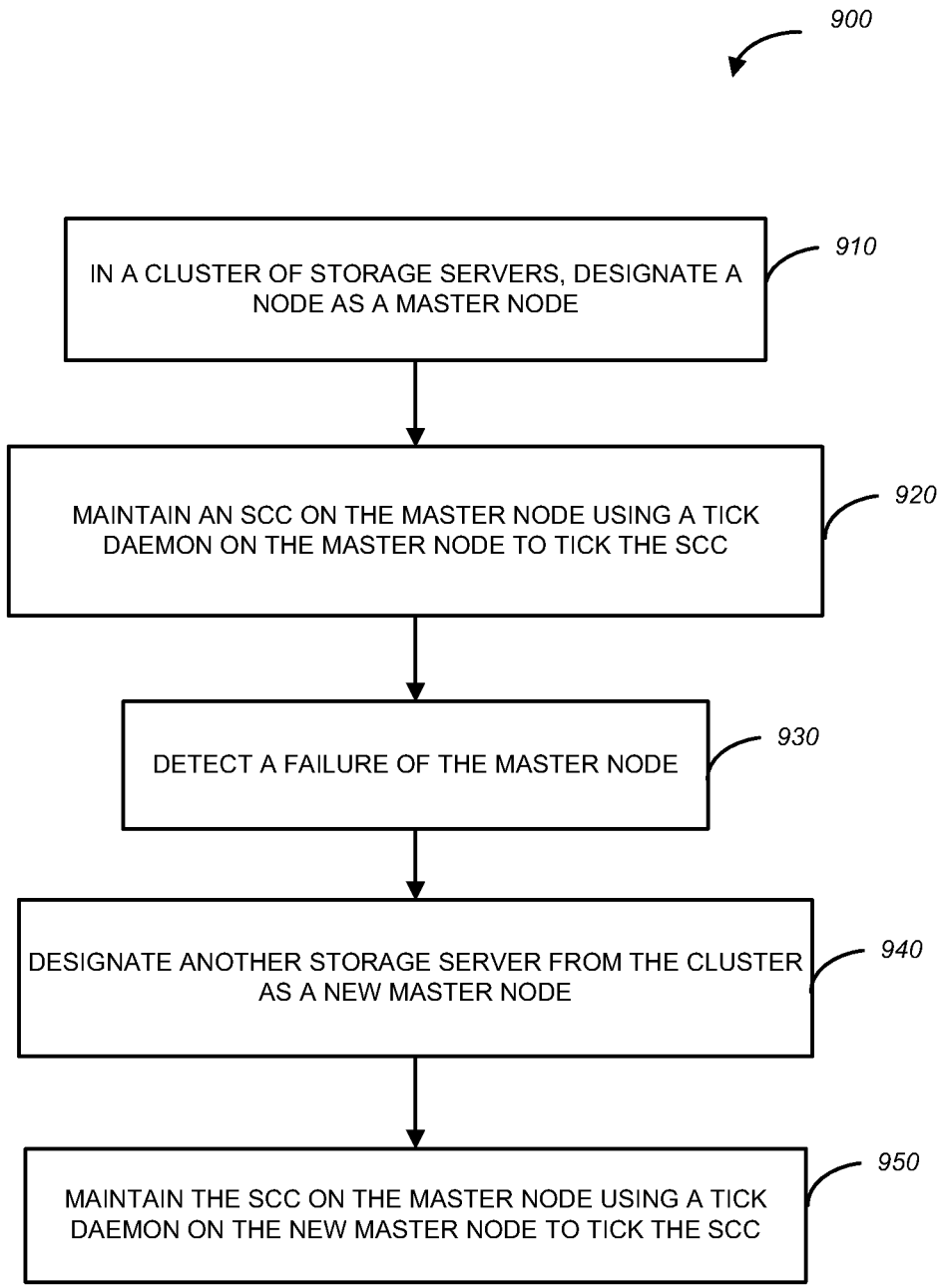
FIG. 9 is a flow chart of a failover method in a cluster of storage servers, according to one example embodiment.

FIG. 9 is a flow chart of a failover method 900 in a cluster of storage servers, according to one example embodiment. The method 900 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the storage server 500 shown in FIG. 5.

As shown in FIG. 9, the method 900 commences at operation 910, where a storage server (a node) in a cluster of storage servers is designated as a master node for the purposes of maintaining a system-wide compliance clock. In one embodiment, a data structure may be maintained by the cluster including a list of node entries, each node entry indicating whether the associated node is designated as the master node. The tick daemon running on the master node is used to periodically increase the value of the SCC based on hardware ticks (operation 920). At operation 930, a failure of the master node is detected, e.g., by utilizing a process running on each of the nodes for determining that a request from one node in the cluster to any other node in the cluster fails with a certain error indication. Another storage server from the cluster is designated as a new master node (e.g., based on the order in which the nodes joined the cluster or some other criteria) (operation 940). A tick daemon running on the new master node is now used to tick the SCC (operation 950).

Figure 10:
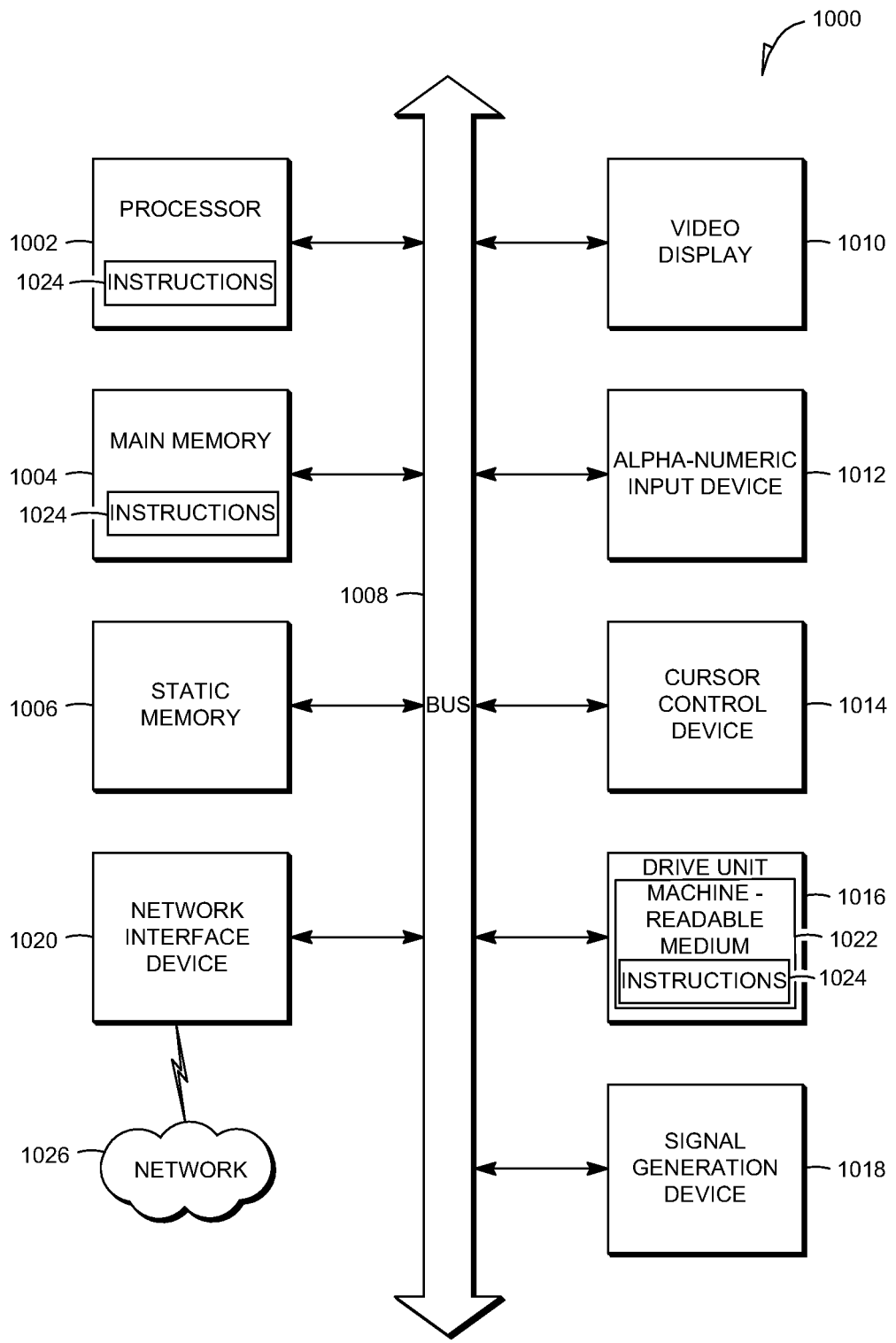
FIG. 10 is a diagrammatic representation of an example machine in the form of a computer system within which a set of instructions, for causing the machine to perform any one or more of the methodologies discussed herein, may be executed.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a user interface (UI) navigation device 1014 (e.g., a cursor control device), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, with the main memory 1004 and the processor 1002 also constituting machine-readable media.

The software 1024 may further be transmitted or received over a network 1026 via the network interface device 1020 utilizing any one of a number of well-known transfer protocols (e.g., Hyper Text Transfer Protocol (HTTP)).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

Thus, method and system for providing an improved compliance clock service have been described. The techniques described herein may be adapted for use in other systems that include customizable and/or complex installation configurations. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The invention claimed is:

1. A computer-implemented method comprising:
   using one or more processors to perform operations of:
   establishing a system compliance clock (SCC) for a storage system that provides a compliant storage service, the storage system associated with a plurality of volumes, a current value of the SCC being periodically updated;
   establishing, for a volume from the plurality of volumes, a volume compliance clock (VCC), the volume compliance clock maintaining a current value of the VCC;
   storing a SCC reference value on the volume, the SCC reference value reflecting a time stamp of a last update of the current value of the VCC;
   determining an updated value of the VCC as a sum of the current value of the VCC and an elapsed time value, the elapsed time value is determined by subtracting the SCC reference value from the current value of the SCC;
   updating the current value of the VCC with the updated value of the VCC; and
   updating the SCC reference value with the current value of the SCC.

2. The method of claim 1, further comprising deploying the compliant storage service to a cloud, utilizing cloud computing infrastructure.

3. The method of claim 1, further comprising updating a current value of the VCC in response to determining that the SCC is a trusted SCC.

4. The method of claim 3, wherein the determining that the SCC is the trusted SCC comprises utilizing compliance clock metadata stored on the volume.

5. The method of claim 4, wherein the compliance clock metadata comprises identification of a storage server associated with the volume and identification of the SCC.

6. The method of claim 1, wherein the storage system comprises a single storage server.

7. The method of claim 1, wherein the storage system comprises a plurality of storage servers.

8. The method of claim 7, wherein one storage server from the plurality of storage servers is designated as a master node, and wherein the method further comprises using the master node to maintain the current value of the SCC and to provide the current value of the SCC to other storage servers from the plurality of storage servers.

9. The method of claim 8, further comprising:
   detecting a failure of the master node; and
   designating a further storage server from the plurality of storage servers as a new master node, the new master node to maintain the current value of the SCC and to provide the current value of the SCC to other storage servers from the plurality of storage servers.

10. A computer-implemented storage system comprising:
   a system compliance clock (SCC), a current value of the SCC being periodically updated;
   a volume compliance clock (VCC) associated with a single volume from a plurality of volumes in the storage system), the VCC maintaining a current value of the VCC;
   a VCC update trigger to detect an update event;
   a current SCC value detector to determine the current value of the SCC at a time of the update event;
   a VCC value keeper to store the current value of the VCC on the volume;
   a SCC reference value keeper to store a SCC reference value on the volume and to update the SCC reference value with the current value of the SCC, the SCC reference value reflecting a time stamp of a last update of the current value of the VCC;
   an updated VCC value calculator to update the current value of the VCC based on an updated value of the VCC, the updated value of the VCC calculated as a sum of the current value of the VCC and an elapsed time value, the elapsed time value being determined by subtracting the SCC reference value from the current value of the SCC.

11. The system of claim 10, wherein the update event is triggered by an update of backup data associated with the volume.

12. The system of claim 10, further comprising a handshake module to determine whether the SCC is a trusted SCC prior to authorizing an update to the current value of the VCC.

13. The system of claim 12, wherein the handshake module is to utilize compliance clock metadata stored on the volume.

14. The system of claim 13, wherein the compliance clock metadata comprises identification of a storage server associated with the volume and identification of the SCC.

15. The system of claim 10, wherein the storage system comprises a single storage server.

16. The system of claim 10, wherein the storage system comprises a plurality of storage servers.

17. The system of claim 16, wherein one storage server from the plurality of storage servers is designated as a master node, the master node to maintain the current value of the SCC and to provide the current value of the SCC to other storage servers from the plurality of storage servers.

18. A machine-readable medium having instruction data to cause a machine to:
   establish a system compliance clock (SCC) for a storage system, the storage system associated with a volume from a plurality of volumes;
   establish, for the volume, a volume compliance clock (VCC), the volume compliance clock to update its value based on a current value of the SCC;
   deploy a compliant storage service associated with the storage system to a cloud, utilizing cloud computing infrastructure;
   store the current value of the VCC on the volume;
   store a SCC reference value on the volume, the SCC reference value reflecting a time stamp of a last update of the current value of the VCC;
   update the current value of the VCC based on an updated value of the VCC, the updated value of the VCC calculated as a sum of the current value of the VCC and an elapsed time value, the elapsed time value being determined by subtracting the SCC reference value from the current value of the SCC; and
   update the SCC reference value with the current value of the SCC.

* * * * *